June 20, 1967

J. H. BORNZIN 3,326,422

SEED METERING MECHANISM

Filed Sept. 3, 1965

Inventor
James H. Bornzin
J K McNeill
Attorney

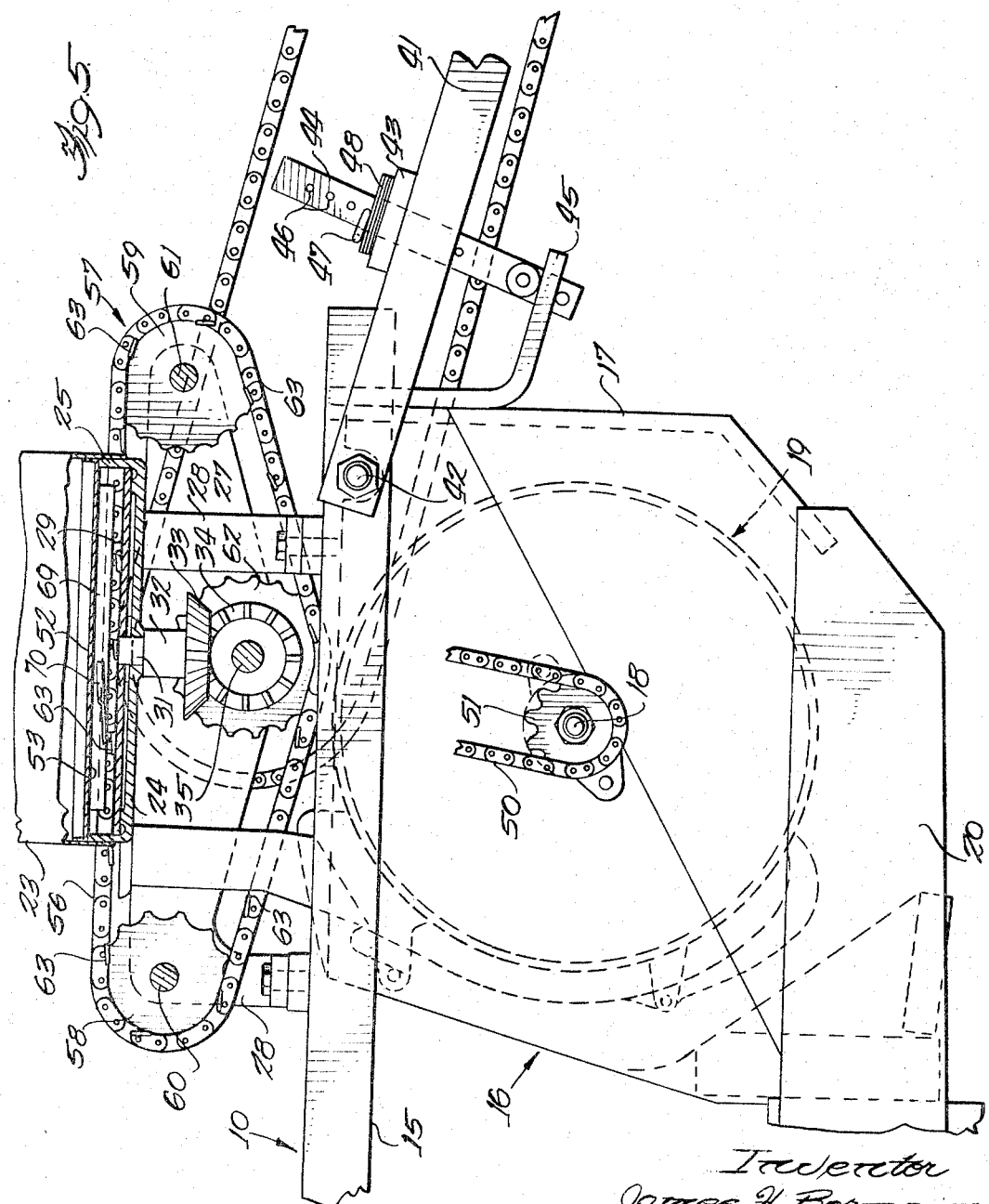

United States Patent Office 3,326,422
Patented June 20, 1967

3,326,422
SEED METERING MECHANISM
James H. Bornzin, La Grange, Ill., assignor, by mesne assignments, to International Harvester Company, Chicago, Ill., a corporation of Delaware
Filed Sept. 3, 1965, Ser. No. 484,931
14 Claims. (Cl. 222—252)

ABSTRACT OF THE DISCLOSURE

A seed metering device wherein seed from a hopper falls on moving platform means in the form of a rotating plate and is carried off the plate for depositing on the ground by an endless chain passing through the hopper and having hooks each adapted to contact and retain a seed. One side of the plate due to its rotation moves the seed toward the chain at one side of a vertical plane, while seed not selected by the hooks is moved away from the chain at the other side of said plane.

This invention relates to agricultural implements and particularly to planters. More specifically the invention concerns novel precision seed metering apparatus.

An object of the invention is to provide, in a planter, novel mechanism for selecting seeds and discharging them from a seed hopper at regular intervals and with uniform velocity.

Another object of the invention is to provide precision seed selecting mechanism for a planter including an endless chain having seed retaining means thereon at regular intervals and driven transversely through a seed hopper to trap a seed in the retainer and deliver it to an outlet from which it is discharged to the ground.

Another object of the invention is to provide novel seed selecting and retaining means operated in association with a planter hopper, wherein means are provided for forcibly directing seed to the selecting and retaining means and for forcibly removing excess seed therefrom.

Other objects and advantages of the invention will become clear from the following detailed description when read in conjunction with the accompanying drawings wherein:

FIGURE 4 is an enlarged sectional view of a portion of the structure shown in FIGURE 3; and FIGURE 5 is an enlarged sectional view of a portion of the structure shown in FIGURE 1.

Figure 1:
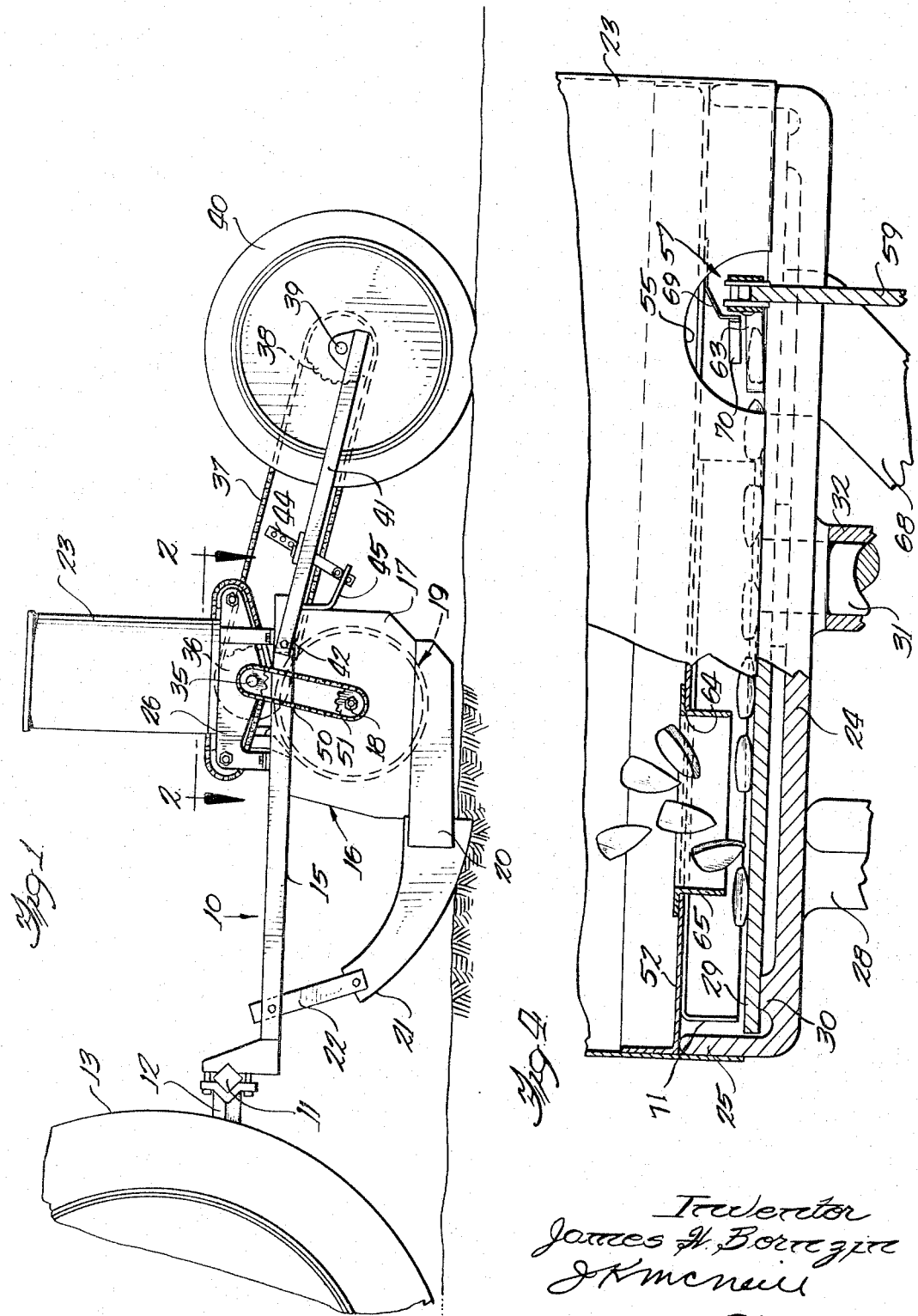
FIGURE 1 is a view in side elevation of a planter unit incorporating the features of this invention.

In the drawings the numeral 10 designates the frame of a ground-drive planter unit adapted for attachment to a transversely extending tool bar 11 secured to the drawbar 12 of a tractor 13. Frame 10 includes laterally spaced frame bars 14 and 15 to which is secured a planter boot 16 comprising spaced plates 17 having a shaft 18 mounted therein which carries a rotary seed wheel indicated at 19, the details of construction of which form no part of this invention.

To the lower end of boot 16 is secured a furrow opener 20, the forward end 21 of which curves upwardly and is connected by one or more straps 22 to the frame 10. Seed is metered to the seed wheel 19 from which it is discharged into the furrow formed by the furrow opener 20, by seed dispensing apparatus including a seed containing hopper 23, cylindrical in shape, having a cast bottom 24 provided with an upwardly directed flange section 25 secured to the inner face of the lower sides of the walls of the hopper. Also forming a part of the bottom plate 24 and cast therewith is a pair of triangularly shaped brackets 26 and 27 carrying a plurality of depending legs 28 by which the dispensing mechanism is mounted on the frame 10.

A rotatable seed plate 29 is mounted on the hopper bottom 24 in engagement with an annular rib 30, and has secured thereto a central shaft 31, rotatable in a bearing 32 secured to and depending from the hopper bottom 24, shaft 31 having mounted on its lower end a bevel gear 33, operatively engageable with another bevel gear 34 mounted on a shaft 35 rotatably carried by the members 26 and 27. One end of shaft 35 projecting from the supporting member 27, has mounted thereon a sprocket wheel 36 which is connected by a drive chain 37 with another sprocket wheel 38 mounted on a shaft 39 carrying a rubber tired combination press and gauge wheel 40 arranged to gauge the depth of penetration of furrow opener 20.

Shaft 39 is rotatably mounted in the rear ends of a pair of laterally spaced wheel arms 41, the forward ends of which are pivoted at 42 upon the bars 14 and 15 of the planter frame. A cross bar 43 connects the arms 41 and is apertured to slidably receive a rod 44, the lower end of which is anchored to a lug 45 secured to boot 16. Rod 44 is provided with a plurality of apertures 46 to adjustably receive a pin 47 spaced from bar 43 by washers 48, and limiting the upward movement of arms 41 and wheel 40 with respect to the frame 10. Drive is thus transmitted from wheel 40 through sprocket wheel 36 and bevel gears 33 and 34, to revolve the seed plate 29. Although the operation of the seed wheel 19 forms no part of this invention, it may be noted that the end of shaft 35 projecting beyond member 26 carries a sprocket wheel 49 which is connected by a chain 50 to a sprocket wheel 51 mounted on shaft 18.

Figure 2:
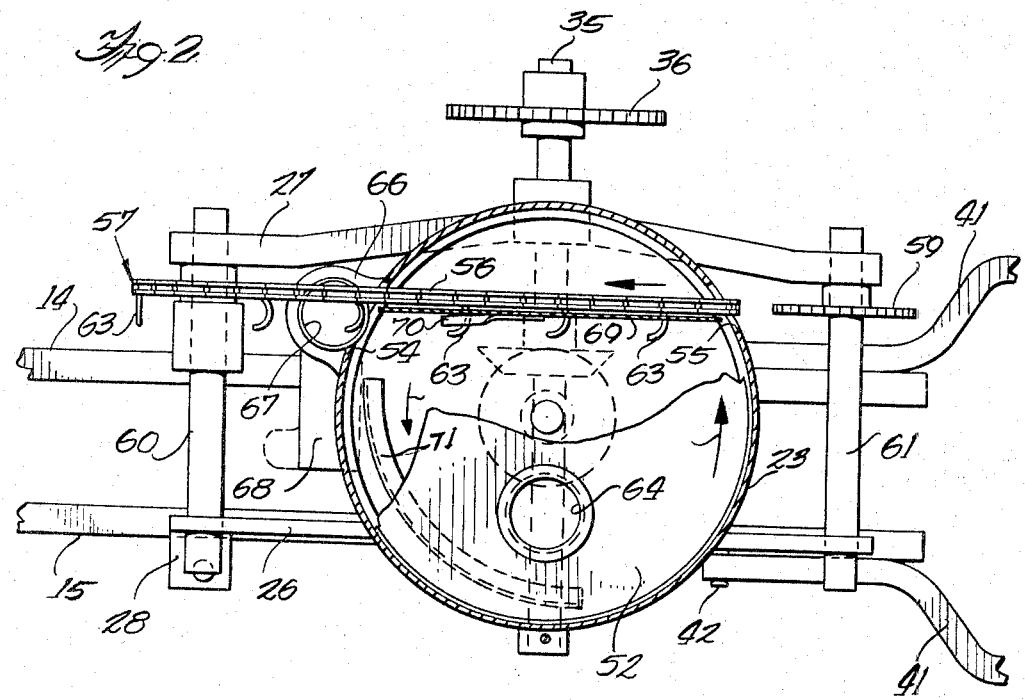
FIGURE 2 is a section taken on the line 2—2 of FIGURE 1, on an enlarged scale.
Figure 3:
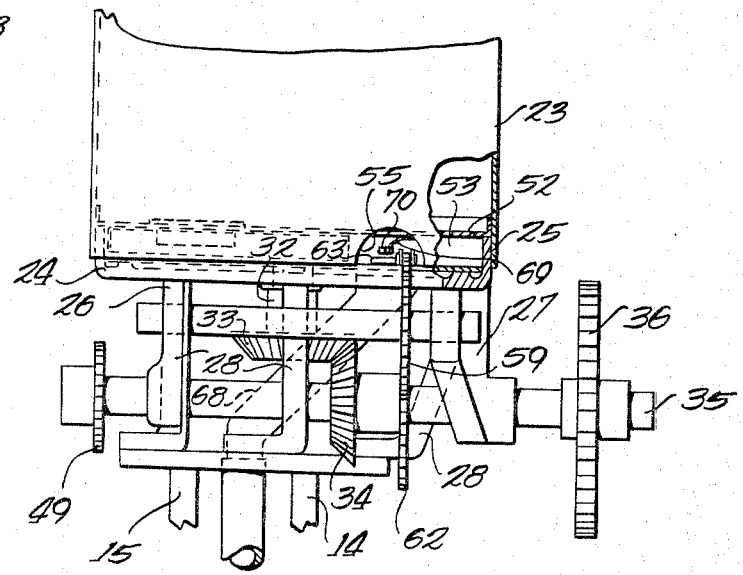
FIGURE 3 is a view in rear elevation, partly in section and with parts removed, of the structure shown in FIGURE 2.

Seed is stored in the hopper 23 and individual seeds are selected and discharged therefrom at regular intervals by mechanism which includes a baffle 52 at the bottom of the hopper engaging the upper edge of flange 25 and providing a space 53 therebetween and the rotatable seed plate 29. Openings 54 and 55 are formed in opposite sides of the walls of hopper 23 and the flanges 25 for the passage through the hopper of the horizontal flight 56 of an endless chain 57 mounted on a pair of sprocket wheels 58 and 59 carried by shafts 60 and 61 rotatably mounted in apertures provided in the ends of members 26 and 27. Chain 57 is driven in the direction of the arrow shown in FIGURE 2 by engagement of the lower flight of the chain with a sprocket wheel 62 mounted on shaft 35.

Alternate links of chain 57 have secured thereto laterally projecting seed retainers of selectors in the form of hook members 63 which ride upon the surface of the seed plate 29 for the purpose of selecting individual seeds and discharging them. To facilitate this procedure, an opening 64 is provided in the baffle or stationary plate 52 and there is mounted therein a short depending tubular member 65 the lower end of which, as indicated in FIGURE 4, is spaced from the rotatable seed plate 29 sufficiently only to accommodate the passage of a single layer of seeds therebetween. The layer of seed on plate 29 is thrown toward the periphery of the wheel by centrifugal force and as shown by the right-hand arrow in FIGURE 2, that section of the revolving plate functions as a conveying means feeding seed into the path of the hooks 63. The seed carried by the hooks 63 passes through opening 54 above an enlargement 66 formed on the hopper bottom 24 and defining an opening 67 through which the seed is dropped as the seed cells formed by the hooks 63 pass over the opening. Due to the direction of rotation of the plate 29, and the direction of movement of chain 56, as shown by the arrow in FIGURE 2, any excess seed in the path of hooks 63 and not received therein, will be forced to follow a path away from the chain. Thus, since seed is dropped on the plate through opening 64 in the position shown in FIGURE 2, the side of the plate between opening 64 and the chain 56 as it enters the hopper acts as a moving platform or feeding section moving in one direction, as indicated by the right-hand arrow in FIGURE 2, and directing seed to the chain to be swept up by hooks 63. The other side of the plate between the opening 64 and the chain 56 serves as a platform moving in the other direction, as indicated by the left-hand arrow in FIGURE 2, to sweep excess seed away from the moving hooks 63 and to return them to the other side of the plate for again feeding seed to the hooks 63. To facilitate return of seed to the right-hand side of plate 29, guide means is provided in the form of a curved baffle or wall member 71 secured to and depending from plate 52 and engageable by the seed to direct it to the right-hand side of seed plate 29.

The seed received in opening 67 passes through a tubular member 68 which extends to a location between both plates 17 at the upper end of wheel 19, the seed being conducted thereby downwardly to the furrow formed by the furrow opener 20.

To prevent the vertical accumulation of seed in the retainers 63, that is, to prevent a seed being carried along on top of another seed in the cell formed by the retainer 63, a retaining wall is provided in the form of a member 69 depending from stationary plate 52 and having secured to and extending laterally therefrom a knock-off member 70 disposed above the hooks 63 and adapted to sweep seed therefrom.

It is believed that the construction and operation of a novel seed metering mechanism of this invention will be clearly understood from the foregoing description. It should likewise be understood that the invention has been described in its preferred embodiment and that modifications may be made therein without departing from the spirit of the invention or the scope of the appended claims.

What is claimed is:

1. In a planter having a frame and a seed hopper mounted on the frame, seed moving platform means mounted at the bottom of the hopper, means on the frame for driving said seed moving platform means, a driven endless flexible member mounted on the frame having a portion thereof passing through the hopper parallel to the plate of said seed moving platform means, The hopper having openings therein accommodating passage of the driven endless member therethrough and an opening for the discharge of seed onto said seed moving platform means, said seed moving platform means including a section of said platform means disposed on one side of a vertical plane through said seed moving platform means adapted to move seed on the platform means in one direction toward said driven endless member, seed retaining means carried by said endless member for receiving and conveying seed directed thereto by said seed moving platform means, and said seed moving means including another section disposed on the other side of said vertical plane adapted to move seed on the seed moving platform means in a direction opposite to that of said first section to convey away from said driven endless member seed not retained by said retainers.

2. The invention set forth in claim 1, wherein said seed moving platform means is a seed plate rotatably mounted in said hopper and adapted in its rotation to convey the seed deposited thereon toward said driven endless member at one side of the axis of said plate and away from said driven endless member at the other side of the axis of said plate.

3. The invention set forth in claim 1, wherein said driven endless flexible member is a chain and said seed retaining means comprises a plurality of hook-like members secured to the chain and extending therefrom parallel to the seed moving platform means in the path of the seed thereon.

4. The invention set forth in claim 3, wherein knock-off means is stationary relative to the endless member and is disposed above said hook-like members to limit the seed retained by said hook-like members to a single layer.

5. In a planter having a frame and a seed hopper mounted on the frame, a seed plate rotatably mounted at the bottom of the hopper, means on the frame for rotating said plate, an endless chain mounted on the frame having a portion thereof passing through the hopper parallel to the plate, the hopper having openings therein accommodating passage of the chain therethrough, and the hopper bottom having an opening for the discharge of seed and for deposition thereof on said plate, means mounted on the frame for driving said chain, and seed retainers formed at spaced locations on said chain to select and isolate seed during passage of the chain through the hopper and to discharge it through one of said openings in the hopper.

6. In a planter having a frame and a seed hopper mounted on the frame, a seed plate rotatably mounted at the bottom of the hopper, means on the frame for rotating said plate, an endless chain mounted on the frame having a portion thereof passing through the hopper parallel to the plate, the hopper having openings therein accommodating passage of the chain therethrough, and the hopper bottom having an opening for the discharge of seed and for deposition thereof on said plate, means mounted on the frame for driving said chain, and seed retainers formed at spaced locations on said chain to select and isolate seed during passage of the chain through the hopper and to discharge it through one of said openings in the hopper, and means mounted in the hopper and interposed between the seed and said plate for limiting the seed deposited on the plate to a single layer.

7. The invention set forth in claim 6, wherein said limiting means is a baffle plate mounted in the hopper above said seed plate and having an opening therein for feeding seed to the seed plate.

8. The invention set forth in claim 7, wherein said opening includes means serving as a tube projecting downwardly and having its outlet spaced from the seed plate sufficiently to accommodate the deposition of only a single layer of seed on said seed plate.

9. The invention set forth in claim 5, wherein said seed retainers are curved fingers secured to the chain and projecting laterally therefrom.

10. The invention set forth in claim 9, wherein knock-off means is carried by the hopper and is disposed above said seed retainers to prevent the vertical accumulation of seed by said retainers.

11. In a planter having a frame and a seed hopper mounted on the frame, a stationary bottom in the hopper, a seed plate rotatably mounted in the hopper below said bottom and providing a space therebetween, means on the frame for rotating said plate, said bottom having an opening therein for feeding seed from the hopper to the plate, an endless chain mounted on the frame outside the hopper and having a horizontal portion extending transversely through the hopper and disposed in said space, means carried by the frame for driving said chain, and seed retaining members mounted on said chain at spaced locations and engageable with the seed on the seed plate.

12. The invention set forth in claim 11, wherein means are provided for limiting the seed deposited on said seed plate to facilitate seed selection by said seed retaining members.

13. The invention set forth in claim 12, wherein opposite openings are provided in the hopper for the passage of said chain therethrough, and a seed discharge outlet is provided adjacent one of said openings to receive seed from said fingers and discharge it to the ground.

14. The invention set forth in claim 13, wherein the chain is driven across one side of the seed plate and the latter is revolved in the same angular direction as the chain and at a rotary speed sufficient to convey excess seed out of the path of said seed-retaining fingers.

References Cited

UNITED STATES PATENTS

| 288,080 | 11/1883 | Lowrey | 222—371 X |
| 3,253,739 | 5/1966 | Martin | 198—103 |

ROBERT B. REEVES, *Primary Examiner.*

F. R. HANDREN, *Assistant Examiner.*